July 22, 1952     F. S. HOWELL     2,604,607
THREE-DIMENSIONAL INDICATOR TUBE AND CIRCUIT THEREFOR
Filed Nov. 28, 1945
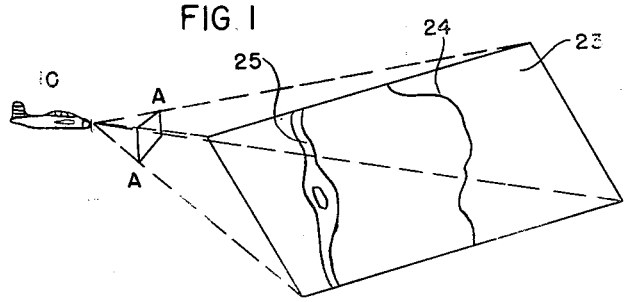
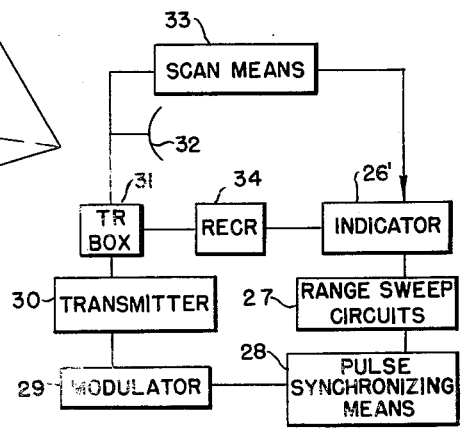
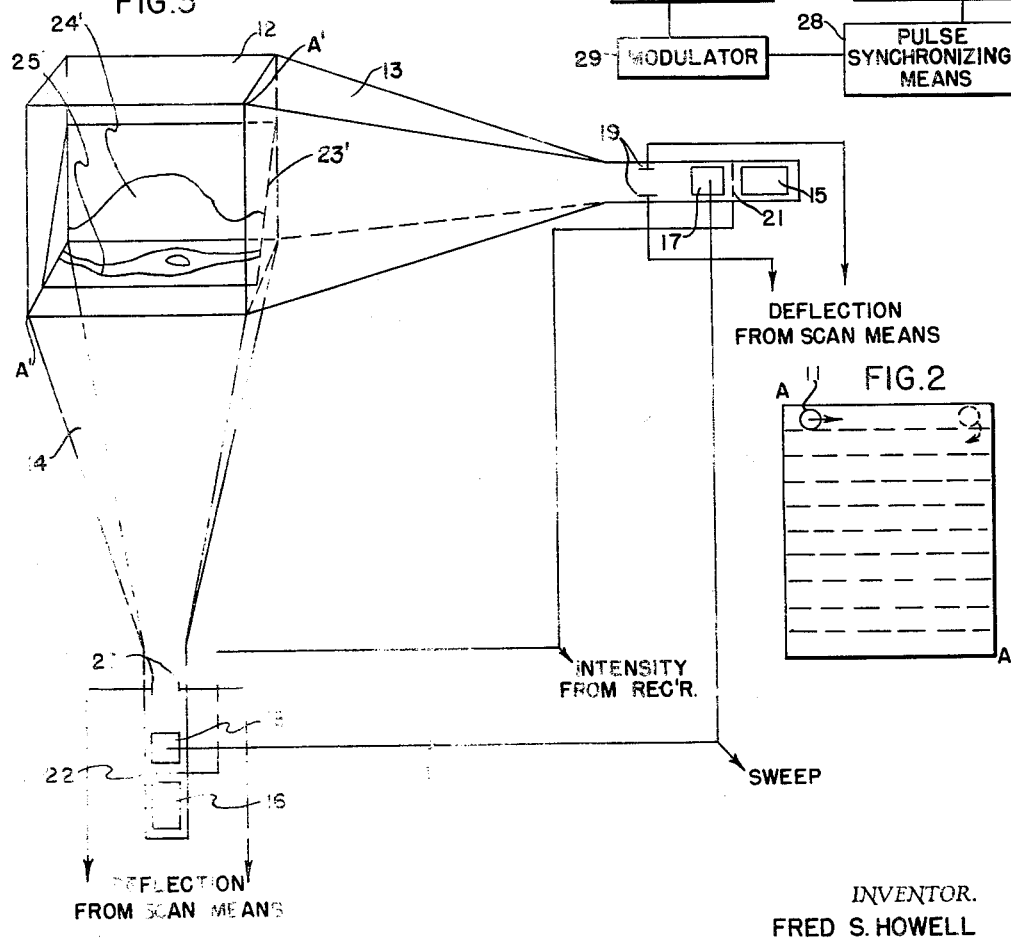
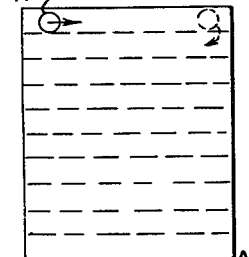
INVENTOR.
FRED S. HOWELL
BY William D. Hall
ATTORNEY.

Patented July 22, 1952

2,604,607

UNITED STATES PATENT OFFICE 2,604,607

THREE-DIMENSIONAL INDICATOR TUBE AND CIRCUIT THEREFOR

Fred S. Howell, Jerseyville, Ill.

Application November 28, 1945, Serial No. 631,455

6 Claims. (Cl. 315—13)

(Granted under the act of March 3, 1883, as amended April 30, 1928; 370 O. G. 757)

The invention described herein, if patented, may be manufactured and used by or for the Government for governmental purposes without the payment to me of any royalties thereon.

This invention relates to radio object-locating system, and more particularly to indicating means adapted for use with radio object-locating systems.

One object of this invention is to provide means for presenting an effective three-dimensional view of the terrain or space viewed by a radio object-locating system.

Another object of the invention is to improve the employment of radio object-locating systems in their usage for overland navigation.

A further object of the invention is to provide a novel type of indicating tube.

Other objects, novel features, and advantages of the invention will be apparent from the description contained herein.

In the drawings:

Fig. 1 is a diagrammatic sketch showing a stretch of terrain which is to be illustrated in the indicator of the invention;

Fig. 2 is a diagram of a raster for the indicator;

Fig. 3 is a diagrammatic sketch of the indicator proposed to be used herein; and Fig. 4 is a block diagram of a system for using the indicator.

In order to present the geometric concepts involved in the invention, reference is made to Fig. 1 which shows in diagrammatic form an airplane 10 in flight. Airplane 10 may be equipped with a radio object-locating system having an antenna which searches in advance of the direction of flight of the plane. A rectangle AA indicates a cross section in a plane generally perpendicular to the axis of the searching pattern of the antenna. The antenna may send out an electromagnetic beam of energy generally conical in nature and subtending a small arc of space; thus the system may provide a narrow search beam of exploratory pulses of energy. This beam of energy, by means known to the art, which may include either or both mechanical or electrical means, may be caused to cover the rectangle AA in some pattern such as the raster illustrated in Fig. 2.

Circle 11 indicates the intersection of the directed beam of energy with rectangle AA which generally follows the path indicated by the dotted lines. For the sake of simplicity it is assumed that when circle 11 in covering rectangle AA, reaches the center thereof, the axis of the beam of energy will be perpendicular to the plane of the rectangle. Other methods of scanning a given segment or portion of space are known to the art in which the beam of energy may follow other patterns than that illustrated in Fig. 2, and these may cause the space to be explored to overlap or follow other than rectilinear paths. The scheme illustrated herein is to be considered as merely illustrative.

Referring now to Fig. 3, there is illustrated in diagrammatic form a tube 12 of the type herein proposed as an indicator for displaying to an observer information acquired by the radio object-locating system. Such a tube may have a rectangular viewing section and communicating therewith portions 13 and 14 extending radially from any two adjacent sides of the viewing section of tube 12. Portions 13 and 14 are provided with electron guns 15 and 16, respectively, each suitable for forming a beam of electron rays directed toward the viewing section of tube 12, preferably axially along portion 13 or 14. Portions 13 and 14 are also supplied with deflecting means such as plates 17 and 18, respectively, and plates 19 and 20, respectively. The manner in which the viewing section of tube 12 may be used to indicate to an observer the nature of the terrain illuminated by the radio object-locating system may be explained by supposing that rectangle AA of Fig. 1 corresponds to the plane designated A'A' of Fig. 3. Furthermore, it is preferable that a small angular deflection of each electron beam is sufficient to sweep it across that face of the viewing section through which the portion from which it derives communicates. That is, each electron gun is preferably a comparatively long distance from the viewing section of tube 12 so that a small angular deflection of each electron beam is sufficient to carry it across the viewing section, and so is substantially proportional to a transverse linear displacement of a segment of the beam a fixed distance from the gun.

One important characteristic of the tube 12 of Fig. 3 is in that it is not completely exhausted as would be an ordinary cathode ray tube or vacuum tube. On the contrary, this tube is gas filled. The velocity and intensity of each of the electron beams from portions 13 and 14 is such as to be below or less than the critical or threshold value which causes the path of the electrons to be illuminated and visible to the eye. Even when the two beams intersect, no illumination is visible to the eye due to the adjustment of the intensities. As will be described in greater detail, it is contemplated that the electron beams from the two said portions 13 and 14 always intersect, the volume of intersection representing what we may consider as an incremental volume. Each of electron guns 15 and 16 is also supplied with the usual intensity control grids 21 and 22 respectively. It is also contemplated, as will appear more fully, that the intensity and velocity of electrons of the intersecting beams are so close to the above described threshold value that a slight increase of said intensity by the impress on grids 21 and 22, or one of them, of returned signals or echoes in response to exploratory pulses of electromagnetic energy radiated from the radio object-locating system antenna will cause visible light to emanate from the neighborhood of the defined incremental volume. A gas suitable for use in the described tube, and which has the property of continuing to emanate light from the excited portion of the gas during and for a brief time after the exciting electron stream has been removed, is nitrogen, as noted in Hackh's Chemical Dictionary, third edition, pages 575–576, published in 1944 by the Blakiston Company, Philadelpha, Pennsylvania, and edited by Julius Grant.

In order to exemplify the workings of the invention, suppose a stretch of terrain such as 23 of Fig. 1 including a hill 24 and a river 25 to be viewed through rectangle AA as by an observer from airplane 10. Synchronizing means are employed in starting a sweep of the intersection of the electron beams from electron guns 15 and 16 (adjusted always to intersect) but it may be initiated some microseconds subsequent to the emanation of the exploratory pulses from the radio object-locating system antenna. After the beginning of the sweep, it is linear with time for a designated number of microseconds depending on the range to be searched. This sweep voltage the amplitude of which is proportional to range, is applied to deflecting plates 17 and 18, which serve to move the intersection of the electron beams in a direction generally perpendicular to the plane of the intersecting beams and plane A'A'. The voltages on deflecting plates 19 and 20 are synchronized with the angular scanning movement of the beam of electromagnetic energy, resulting in the movement of the intersecting beams parallel to their planes. The result of the deflecting voltages upon plates 17, 18, 19, and 20, as viewed through plane A'A' of the viewing section, is that the intersection of the electron beams duplicates the scanning of terrain 23 of Fig. 1. The rate of recurrence of the exploratory pulses of radiant energy is such that each sweep in range is completed in rapid sequence compared to the scanning motion of the beam of energy. The deflection of the electron beams in the manner described above causes their intersection to substantailly cover a volume in the viewing section of the tube in timed relationship with the manner in which the exploratory pulses of energy explore the sector of space in which lies the stretch of terrain 23.

Furthermore, echoes are received from the pulses of energy and applied to grids 21 and 22, which cause the gas within the viewing section of tube 12 to be illuminated at a depth normal from A'A' substantially proportional to the range of the target, and displaced comparative distances from a line normal to plane A'A', said distance being substantially proportional to the azimuthal displacement of the target returning the signal, as measured from a line normal to plane AA. Thus, light emanations will produce terrain 23' and images 24' and 25', of terrain 23' and hill 24 and river 25, in their proper relative position within the viewing section of tube 12 and visible to the eye through any transparent portion of the walls of the viewing section. If studied through plane A'A', a wall of said viewing section that is parallel to the plane of said intersecting beams, to an observer some distance therefrom the image will be a scaled reproduction of the terrain as viewed by an observer in airplane 10 viewing the section of terrain 23 through rectangle AA, except that objects therein will be apparent as light emanations, the intensity of which will vary proportionally to the strength of returned signals. Persistence of the light emanations causes the image to remain visible as the space in the viewing section is covered in timed relationship to the covering of the chosen sector of space in advance of airplane 10 by the exploratory pulses of energy. Moreover, as viewed from any point, the light emanations present a scaled reproduction such as images 24' and 25' of objects within the purview of the exploratory pulses of energy from the antenna of the radio object-locating system.

A system suitable for use in connection with the indicating means herein disclosed is illustrated in block diagram in Fig. 4. Indicator 26' may be the tube illustrated in Fig. 3. A suitable range sweep circuit 27 is provided which may be connected to deflecting plates 17 and 18 of Fig. 3. Pulse synchronizing means 28 may comprise circuits for initiating pulses at a desired recurrence rate and controlling the sweep circuits in accordance therewith. Modulator 29 may be the means for controlling transmitter 30 in accordance with the pulse recurrence rate set by synchronizing means 28 and suitable to cause the transmitter to send ratio-frequency energy through the transmit-receive (TR) box 31 into space in a directed beam of exploratory pulses of radio-frequency energy from antenna 32. Scanning means 33 may comprise means suitable to cause the antenna to scan in accordance with some scheme such as that designated in Fig. 2 or any other suitable pattern for covering a chosen sector of space, and means for coordinating the deflecting voltages to plates 19 and 20 of Fig. 3 therewith. Receiver 34 may include any necessary radio-frequency, intermediate-frequency, and video-frequency amplifying and detector stages. The output from the receiver is used to control the intensity of the intersecting electron beams and may be utilized by placing positive pulses on both or one of grids 21 and 22 of Fig. 3.

TR box 31 is any one of the numerous well known devices for permitting radio-frequency energy to pass from transmitter 30 to antenna 32, but not from transmitter 30 to receiver 34, and conversely permitting radio-frequency energy to be received by receiver 34 from antenna 32 but blocking energy from passing from antenna 32 to transmitter 30. The details of the components of Fig. 4 other than indicator 26' are not discussed because these may be devised by those skilled in the art and the invention is not directed to such details.

It will be apparent to those skilled in the art that there are many variations of the invention. Therefore, it is not desired to restrict the scope of the invention to the precise embodiment herein disclosed.

What is claimed is:

1. A three dimensional indicator tube comprising an envelope including a viewing section having at least one transparent wall, a plurality of electron beam forming means for directing a plurality of electron beams within said viewing section, said electron beams intersecting within said viewing section, and a gas confined within said envelope said gas having the property of emitting light in the vicinity of the intersection of said beams when the beam intensity at said intersection exceeds a predetermined level, said gas having the further property of continuing to emit light for a predetermined time after said intensity has dropped below said predetermined level.

2. An indicator tube comprising an envelope including a viewing section having a transparent wall, a first and a second electron beam forming means mounted inside said envelope for providing two intersecting electron beams, each of said beam forming means including beam deflecting means and an intensity control means, the axes of both said beam forming means intersecting one other within said viewing section, and a gas confined within said envelope, said gas having the property of emitting light in the vicinity of an electron beam when the intensity of said beam exceeds a predetermined level, said gas having the further property of continuing to emit light for a predetermined time after the intensity of said electron beam has dropped below said predetermined level.

3. A system for a three dimensional indicator comprising an indicator tube including an envelope formed with a viewing section, first and second beam forming means mounted within said envelope and providing first and second electron beams, each of said beam forming means including first and second beam deflecting means and an intensity control means and a gas confined within said envelope, said gas having the property of emitting light in the vicinity of an electron beam when the intensity of said electron beam exceeds a predetermined level, said gas having the further property of continuing to emit light for a predetermined time after the intensity of said electron beam drops below said predetermined level; sweep means coupled to said first deflecting means in each of said beam forming means for causing said electron beams to intersect in a volume small compared to the volume of said viewing section, sweep means coupled to said second deflecting means in each of said beam forming means for causing said volume of intersection to scan systematically a predetermined volume within said viewing section; and means coupled to at least one of said intensity control means for intensifying at predetermined times at least one of said two electron beams whereby said gas in the vicinity of said volume of intersection is caused to emit light thereby forming a three dimensional luminous image within said viewing section.

4. A system for a three dimensional indicator comprising a viewing tube including an enclosing envelope formed with a viewing section having a transparent wall, a first and a second electron gun mounted inside said envelope and providing a first and a second electron beam, each electron gun including intensity control means and first and second beam deflecting means, and a gas confined within said envelope, said gas having the property of emitting light in the vicinity of an electron beam whenever the intensity of said beam exceeds a predetermined level, said gas having the further property of continuing to emit light for a predetermined time after the intensity of said electron beam drops below said predetermined level; a first sweep generator means having a signal output thereof connected to said first beam deflecting means in each of said electron guns, said first sweep generator means providing a sweep signal such that said two electron beams always intersect at a point and so that said point of intersection scans rapidly along lines substantially perpendicular to the plane of said electron beams, a second sweep generator having a first signal output connected to said second deflecting means in said first electron gun and having a second signal output thereof connected to said second deflecting means in said second electron gun, said second sweep generator means providing signals that cause said point of intersection to scan systematically a predetermined area in planes substantially parallel to the plane of said electron beams, said scan in said planes parallel to the plane of said electron beam being at a lower rate than the scan along lines perpendicular to the plane of said beams; and an intensity control circuit having a first signal output connected to said intensity control in said first electron gun and a second signal output connected to the intensity control in said second electron gun, said intensity control circuit providing signals to said intensity controls such that the gas at the point of intersection of said two electron beams is normally non-luminous, said intensity control circuit providing intensifying signals coordinated in time with said scans to said intensity control in at least one of said electron guns, thereby causing the gas at the point of intersection of said electron beams to emit light whereby a three dimensional luminous image is formed within said viewing section which may be observed through said transparent wall.

5. The tube of claim 2, wherein said gas is nitrogen.

6. The system of claim 4, wherein said gas is nitrogen.

FRED S. HOWELL.

REFERENCES CITED

The following references are of record in the file of this patent:

UNITED STATES PATENTS

| Number | Name | Date |
|---|---|---|
| 2,030,492 | Applebaum | Feb. 11, 1936 |
| 2,175,702 | Rose | Oct. 10, 1939 |
| 2,213,070 | Farnsworth | Aug. 27, 1940 |
| 2,280,191 | Hergenrother | Apr. 21, 1942 |
| 2,291,965 | Jancke et al. | Aug. 4, 1942 |
| 2,543,793 | Marks | Mar. 6, 1951 |